US000001313H

United States Statutory Invention Registration [19]

[11] Reg. Number: H1313

Johnson et al.

[43] Published: May 3, 1994

[54] PROCESS OF MAKING POLY(GLYCIDYL AZIDE) PRODUCT AND COMPOUNDS USEFUL THEREIN

[75] Inventors: Kim L. Johnson, Cottage Grove; Thomas P. Klun, Lakeland, both of Minn.

[73] Assignee: Minnesota Mining and Manufacturing Company, St. Paul, Minn.

[21] Appl. No.: 752,376

[22] Filed: Aug. 30, 1991

[51] Int. Cl.[5] ..... C07F 1/00
[52] U.S. Cl. ..... 552/11; 552/10
[58] Field of Search ..... 552/10, 11

[56] References Cited

U.S. PATENT DOCUMENTS 4,379,894 4/1983 Frankel et al. ..... 552/11

OTHER PUBLICATIONS

Starks, et al., *Phase Transfer Catalysis* p. 58 (1978).

*Primary Examiner*—Robert L. Stoll
*Assistant Examiner*—Joseph D. Anthony
*Attorney, Agent, or Firm*—Gary L. Griswold; Walter N. Kirn; Eloise J. Maki

[57] ABSTRACT

A method of making a product comprising poly(glycidyl azide) by reacting polyepichlorohydrin and alkali and/or alkaline earth metal azides in the presence of certain quaternary amine compounds.

9 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS OF MAKING POLY(GLYCIDYL AZIDE) PRODUCT AND COMPOUNDS USEFUL THEREIN

The U.S. government has certain rights in this invention pursuant to Contract No. 33615-89-C-5713 awarded by the U.S. Air Force.

FIELD OF THE INVENTION

This invention relates to a process of making a poly(glycidyl azide) polymer and quaternary, nitrogen-containing compounds useful in the process.

BACKGROUND OF THE INVENTION

A number of methods of preparing poly(glycidyl azide) polymer from polyepichlorohydrin polymer by the nucleophilic displacement of leaving groups, e.g. chlorine atoms, present in the polyepichlorohydrin polymer with azide ion are known. For example, see U.S. Pat. Nos. 4,268,450 (Frankel et al), 4,379,894 (Frankel et al), 4,486,351 (Earl), 3,645,917 (Vandenberg), 4,879,419 (Johannessen) and 4,937,361 (Wagner et al).

U.S. Pat. No. 4,379,894 describes a process of reacting polyepichlorohydrin and sodium azide in an aqueous medium in the presence of a phase transfer catalyst. The '894 patent describes a reaction using one liter of water with 248 grams of polyepichlorohydrin and 211 grams of sodium azide. Although a reaction utilizing such a relatively large amount of water may, as noted in the '894 patent, avoid the expense of the dipolar aprotic solvents, it is believed that such reactions will be relatively slow. The '894 patent also states that tertiary amines and quaternary ammonium compounds can be used as phase transfer catalysts in the reaction. It is not believed that tertiary amines are very effective phase transfer catalysts for the polyepichlorohydrin-sodium azide reaction. While the '894 patent states that quaternary ammonium compounds can be used as phase transfer catalysts in the reaction, only methyl tricaprylammonium chloride and ALIQUAT TM 336 are specifically described or exemplified and it is believed that such compounds will undergo decomposition or degradation reactions during the polyepichlorohydrin-sodium azide reaction to form undesirable products, such as tertiary amines, which are not very useful in promoting the polyepichlorohydrin-azide reaction. Additionally, it is believed that such quaternary ammonium compounds are difficult to remove from the poly(glycidyl azide) polymer reducing their recyclability, and their undesirable decomposition or degradation products are also believed to be difficult to remove from the poly(glycidyl azide) polymer.

U.S. Pat. No. 4,937,361 describes a method of making a poly(glycidyl azide) polymer by reacting polyepichlorohydrin, sodium azide and "chlorides and bromides of quaternary ammonium and lithium cations" in a reaction solvent. The patent states that the chlorides and bromides of quaternary ammonium and lithium cations metathesize with the sodium azide to produce an azide compound that is more soluble than sodium azide in the reaction mixture, however, the only quaternary ammonium compounds specifically described or exemplified in the patent are methyltrioctylammonium chloride and dodecyltrimethylammonium chloride, and even in the organic reaction solvents described, such compounds are not believed to be particularly stable, and as explained above, both the quatrenary ammonium compounds and their degradation or decomposition products are believed to be difficult to remove from the poly(glycidyl azide) polymer.

SUMMARY OF THE INVENTION

In one aspect, this invention includes a method of making a product comprising, and preferably consisting essentially of poly(glycidyl azide) polymer by reacting polyepichlorohydrin and the alkali and/or alkaline earth metal azides, the method comprising the steps of:

(A) Preparing a mixture comprising:

(1) alkali and/or alkaline earth metal azides (hereinafter referred to as "azides");

(2) an effective amount, e.g., 10 to 60 parts per 100 parts polyepichlorohydrin polymer, of quaternary amine compound which compound is selected from the group consisting of compounds having the following representative formulas:

$$(R^1)_a(R^2)_{(4-a)}N^{(+)}X^{(-)}, \quad \text{(I)}$$

$$(R^3)_2NC_5H_4N^{(+)}R^1\ R^1X^{(-)}, \quad \text{(II)}$$

$$(R^3)_2NC_6H_4R^4{=}R^4C_5H_4N^{(+}\ R^1X^{(-)} \quad \text{(III)}$$

$$[(R^2)_3N^{(+)}]_2R^8\ X^{(-)}{}_2 \quad \text{(IV)}$$

$$[(R^3)_2NC_5H_4N^{+}]_2R^8\ X^{(-)}{}_2 \quad \text{(V)}$$

and blends of compounds having the representative formula (I), (II), (III), (IV) and (V), wherein:

(a) $R^1$ can be the same or different and selected from: $\{[R^5(OR^6)_b]_{(2-c)}(R^5)_cN[C(R^7)_2]_d\}_eC(R^7)_{(3-e)}CH_2$—, or $\{R^5(OR^6)_fO[C(R^7)_2]_d\}_eC(R^7)_{(3-e)}CH_2$—, or $\{R^5(OR^6)_bQ[C(R^7)_2]_d\}_eC(R^7)_{(3-e)}CH_2$—, wherein $R^5$ groups an be the same or different and are selected from hydrogen or a $C_1$ to $C_{10}$, and preferably $C_1$ to $C_3$ alkyl group, $R^6$ groups can be the same and different and are divalent organic groups, preferably —$CH_2$—, —$C_2H_4$—, —$CHCH_3CH_2$—, —$CHC_2H_5CH_2$—, —$(CH_2)_4$—, and most preferably —$C_2H_4$—, with —$C_2H_4$—, and comprising at least 50 percent by weight of all $R^6$ groups, $R^7$ groups can be the same or different and are selected from hydrogen and $C_1$ to $C_{10}$ alkyl groups Q is selected from alkylene (e.g., methylene, ethylene and cyclohexylene), arylene (e.g., phenylene) and combinations thereof, and may be substituted with aryl or alkyl groups, oxygen, nitrogen, carbonyl, urylene, carbamato and imino groups, and combinations thereof.

(b) $R^2$ groups are the same or different and are selected from $C_1$ to $C_{10}$, and preferably $C_1$ to $C_5$ alkyl groups, and (c) $R^3$ groups can be the same or different and are selected from $C_1$ to $C_8$ alkyl groups containing oxygen or nitrogen hetero atoms, provided that such hetero atoms are attached only to carbon atoms, and the two $R^6$ groups together with adjacent nitrogen atom shown in formula (II) can form a heterocyclic ring containing 3 to 7 atoms, (d) $R^4$ groups can be the same or different (d) and are selected from —CH=, —$CR^2$= and —N=.

(e) $R^8$ groups are defined as —$CH_2[C(R^7)_2]_{(d+1)}(OR^6)_bQ[C(R^7)_2]_{(d+1)}CH_2$—

(f) a is a number from 1 to 3, (g) b is a number from 1 to 50, and preferably is 1 to 3, (h) c is a number from 0 to 1, (i) d is a number from 1 to 15, and preferably is 1 to 3, (j) e is a number from 1 to 3, (k) f is a number from 0 to 50, and preferably is 1 to 3, and (l) $X^{(-)}$ is a suitable anion, preferably azide and/or chloride, and (B) reacting the mixture prepared in step (A) with polyepichlorohydrin polymer to produce a reaction product, and (C) recovering from the reaction product a product comprising, and preferably consisting essentially of poly(glycidyl azide) polymer.

In another aspect, this invention includes the quaternary amine compounds described hereinabove.

DETAILED DESCRIPTION OF THE INVENTION

The polyepichlorohydrin polymer useful in this invention comprises those polyepichlorohydrin polymers known in the art and mixtures of such polymers. The polyepichlorohydrin polymer is prepared by the polymerization of epichlorohydrin monomer using methods known in the art. Examples of such useful polyepichlorohydrin polymer are described, for example, in U.S. Pat. Nos. 4,431,845 (Young et al), 4,391,970 (Okamato) and 4,879,419 (Johannessen). Typically the particular polyepichlorohydrin polymer used in the invention will be selected based upon the properties desired in the poly(glycidyl azide) polymer. For example, the polyepichlorohydrin polymer may be selected to provide the hydroxyl functionality and molecular weight desired in the poly(glycidyl azide) polymer.

In order to reduce the viscosity of the polyepichlorohydrin polymer and thus improve its stirrability and handlability, the polyepichlorohydrin polymer can mixed or blended with an effective amount of a solvent or diluent to reduce the viscosity of the polymer to the desired level. The solvent or diluent useful for reducing the viscosity of the polyepichlorohydrin polymer includes aprotic organic liquids in which the polyepichlorohydrin polymer and poly(glycidyl azide) polymer are soluble. The solvent or diluent should also be relatively unreactive with the azide and the quaternary amine compound. Preferably, the solvent or diluent is also relatively easy to remove from the reaction product by known methods, such as vacuum evaporation.

The solvent or diluent can also be used to reduce the viscosity of the mixture prepared in step (A) of the method and/or to maintain the viscosity of the mixture at an acceptable level throughout the reaction.

While the solvent or diluent used to reduce the viscosity of the mixture prepared in step (A) does not have to be the same as that used to reduce the viscosity of the polyepichlorohydrin polymer, preferably they are the same. Representative examples of said solvent or diluent include tetrahydrofuran, 1,3-dioxolane, 1,4-dioxane and $CH_3O(C_2H_4O)_nCH_3$ where n is equal to a number from 1 to 7.

The amount of the solvent or diluent used to reduce the viscosity of the polyepichlorohydrin will depend upon the viscosity of the polyepichlorohydrin polymer desired, however, the amount of solvent or diluent should be the minimum necessary to achieve the desired viscosity level because excess solvent could slow the reaction between the azide and polyepichlorohydrin and must be removed from the reaction product. While amounts of solvent or diluent up to sixty weight percent (60%) of the polyepichlorohydrin polymer may be used to reduce the viscosity of the polyepichlorohydrin polymer, amounts of five (5) to forty (40) weight percent are more typically used. The amount of solvent or diluent added to the mixture prepared in step (A) should be effective to maintain the viscosity of the mixture at the desired level throughout the reaction, and maintain the concentration of poly(glycidyl azide) polymer in the reaction mixture at a level that is not considered an explosion hazard, but preferably it will also be used at its minimum effective level to reduce any retarding effect it may have on the polyepichlorohydrin-azide reaction rate and the amount that must be removed from the reaction product. Typically, the mixture prepared in step (A) can contain about 15 to 30 parts of solvent or diluent per 100 parts of polyepichlorohydrin reacted, regardless whether the polyepichlorohydrin polymer also contains solvent or diluent.

The azide compounds useful in this invention includes the alkali earth metal and alkaline metal azide salts, such as sodium azide, lithium azide and potassium azide. Preferably, sodium azide is used in this invention, and it is granulated to permit better dispersion of the azide in the mixture prepared in step (A). Generally, the azide is used in a stoichiometric ratio with the polyepichlorohydrin or in a slight excess. Preferably, seventy (70) to ninety (90) parts of azide per one-hundred (100) parts of polyepichlorohydrin polymer (i.e., 1.0 to 1.29 mols per mol of polyepichlorohydrin polymer) are used in the reaction.

The quaternary amine compounds useful in this invention, are believed to be novel and are selected from the group consisting of compounds having the following representative formulas:

$$(R^1)_a(R^2)_{(4-a)}N^{(+)}X^{(-)}, \quad \text{(I)}$$

$$(R^3)_2NC_5H_4N^{(+)}R^1X^{(-)}, \quad \text{(II)}$$

$$(R^3)_2NC_6H_4R^4{=}R^4C_5H_4N^{(+)}R^1X^{(-)} \quad \text{(III)}$$

$$[(R^2)_3N^{(+)}]_2R^8X^{(-)}{}_2 \quad \text{(IV)}$$

$$[(R^3)_2NC_5H_4N^{+}]_2R^8X^{(-)}{}_2 \quad \text{(V)}$$

and blends of compounds having the representative formula (I), (II), (III), (IV) and (V), wherein:

(a) $R^1$ can be the same or different and selected from: $\{[R^5(OR^6)_b]_{(2-e)}(R^5)_cN[C(R^7)_2]_d\}_eC(R^7)_{(3-e)}CH_2$—, or $\{R^5(OR^6)_1O[C(R^7)_2]_d\}_eC(R^7)_{(3-e)}CH_2$—, or $\{R^5(OR^6)_bQ[C(R^7)_2]_d\}_eC(R^7)_{(3-e)}CH_2$—, wherein:

$R^5$ groups can be the same or different and are selected from hydrogen or a $C_1$ to $C_{10}$, and preferably $C_1$ to $C_3$ alkyl group, $R^6$ groups can be the same and different and are divalent organic groups, preferably —$CH_2$—, —$C_2H_4$—, —$CHCH_3CH_2$—, —$CHC_2H_5CH_2$—, —$(CH_2)_4$—, and most preferably —$C_2H_4$—, with —$C_2H_4$— comprising at least 50 percent by weight of all $R^6$ groups, $R^7$ groups can be the same or different and are selected from hydrogen and $C_1$ to $C_{10}$ alkyl groups Q is selected from alkylene (e.g., methylene, ethylene and cyclohexylene), arylene (e.g., phenylene) and combinations thereof, and may be substituted with aryl or alkyl groups, oxygen, nitrogen, carbonyl, urylene, carbamato and imino groups, and combinations thereof.

(b) $R^2$ groups are the same or different and are selected from $C_1$ to $C_{10}$, and preferably $C_1$ to $C_5$ alkyl groups, and (c) $R^3$ groups can be the same or different and are selected from $C_1$ to $C_8$ alkyl groups containing oxygen or nitrogen hetero atoms, provided that such hetero atoms are attached only to carbon atoms, and the two $R^6$ groups together with adjacent nitrogen atom shown in formula (II) can form a heterocyclic ring containing 3 to 7 atoms, (d) $R^4$ groups can be the same or different and are selected from —CH=, —$CR^2$= and —N=.

(e) $R^8$ groups are defined as $-CH_2[C(R^7)_2]_{(d+1)}(OR^6)_bQ[C(R^7)_2]_{(d+1)}CH_2-$ (f) a is a number from 1 to 3, (g) b is a number from 1 to 50, and preferably is 1 to 3, (h) c is a number from 0 to 1, (i) d is a number from 1 to 15, and preferably is 1 to 3, (j) e is a number from 1 to 3, (k) f is a number from 0 to 50, and preferably is 1 to 3, and (l) $X^{(-)}$ is a suitable anion, preferably azide and/or chloride.

The compounds having general formulas (I) and (IV) can be prepared in various ways, for example, by reacting a tertiary amine containing the $R^1$ with an alkylating agent. The compounds having general formulas (III) and (V) can also be prepared in various ways, for example, by reacting a dimethylaminopyridine or 4-methylpiperidinylpyridine with an alkylating agent containing the $R^1$ moiety.

While not wishing to be bound to this theory, it is believed that the quaternary amine salts useful in this invention function as phase transfer catalysts to promote the reaction between the polyepichlorohydrin polymer and azide compound.

Typically, the quaternary amine compound are noncrystalline and thus the azide can be dispersed in it. The quaternary amine compounds also have good stability under the reaction conditions, that is, they do not readily decompose or form undesirable products during the reaction between the polyepichlorohydrin polymer and the azide compound. Preferably, less than five weight percent (5%), and more preferably less than one weight percent (1%), of the initial amount of the quaternary amine compound added to the step (A) mixture will decompose or degrade and form undesirable products. This is important because it permits a large portion of the quaternary amine compound used in the reaction to be recycled. The quaternary amine compounds can be extracted from the reaction product by adding an appropriate amount of an organic liquid to the reaction produce to reduce its viscosity and then using conventional methods to extract its quaternary amine compounds and recover said compounds. For example, after addition of the organic liquid, the reaction produced may be filtered to remove solid impurities and then washed with water or water/alcohol (e.g., methanol) mixtures, and the quaternary amine compound can be recovered from the wash liquid using conventional means such as evaporation to yield the compound at an purity appropriate for use in this invention. Many of the known quaternary ammonium compounds are not as stable as the compounds of the invention, and would form significant amounts of undesirable products (e.g., tertiary amines) due to their decomposition or degradation during the polychlorohydric-azide reaction resulting in reduced recyclability and greater difficulty in purifying the poly(glycidyl azide) polymer product. Additionally, many conventional quaternary ammonium compounds would also be difficult to remove from the reaction product.

The amount of quaternary amine compound used to prepare the mixture of step (A) should be an effective amount to promote the reaction between the polyepichlorohydrin polymer and azide and result in a faster reaction rate and/or a greater degree of reaction completion than the would occur in the absence of the quaternary amine compound. Generally, ten (10) to sixty (60) parts of quaternary amine compound per one hundred (100) parts of polyepichlorohydrin polymer reactant is a useful in this invention.

Representative examples of the quaternary amine compound include:

~30% $(R(OC_2H_4)_a)N(CH_3)CH_2C(CH_3)_2CH_2N^+(CH_3)_3\ Cl^-$

~70% $[R(OC_2H_4)_b][R(OC_2H_4)_c]NCH_2C(CH_3)_2CH_2N^+(CH_3)_3\ Cl^-$ where a=~7, b+c=~7, R is selected from $CH_3$ and H, $[R(OC_2H_4)_b][R(OC_2H_4)_c]NCH_2C(CH_3)_2CH_2N^+(CH_3)_3\ Cl^-$ where b+c=~7, R is selected from $CH_3$ and H, $CH_3O(C_2H_4O)_{11}C(O)NHC_6H_3(CH_3)NHC(O)OCH_2C(CH_3)_2CH_2N^+(CH_3)_3\ Cl^-$, $CH_3O(C_2H_4O)_2C(O)NHC_6H_3(CH_3)NHC(O)OCH_2C(CH_3)_2CH_2N^+(CH_3)_3\ Cl^-$, $CH_3O(C_2H_4O)_{11}C(O)NHC_6H_3(CH_3)NHC(O)OCH_2CH_2CH_2C^+NC_5H_4N(CH_3)_2\ Cl^-$, $CH_3O(C_2H_4O)_2C(O)NHC_6H_3(CH_3)NHC(O)OCH_2CH_2CH_2C^+NC_5H_4N(CH_3)_2\ Cl^-$, $CH_3O(C_2H_4O)_nCH_2CHRCH_2C^+NC_5H_4N(CH_3)_2\ Cl^-$ where n=0–3, R=H or $CH_3$, $CH_3O(C_2H_4O)_nCH_2C(C_2H_5)(C_4H_9)CH_2^+NC_5H_4N(CH_3)_2\ Cl^-$, $CH_3O(C_2H_4O)_nCH_2C(CH_3)_2CH_2^+NC_5H_4N(CH_3)_2\ Cl^-$, $CH_3O(C_2H_4O)_nCH_2C(C_2H_5)(C_4H_9)CH_2^+NC_5H_4N-cyclo-(C_2H_4)_2CHCH_3\ Cl^-$, $CH_3O(C_2H_4O)_nCH_2C(CH_3)_2CH_2^+NC_5H_4N-cyclo-(C_2H_4)_2CHCH_3\ Cl^-$.

Preferably, an effective amount of protic solvent, (e.g. water, methanol and blends thereof) is either (i) mixed with the quaternary amine compound before adding the quaternary amine compound to the step (A) mixture, or (ii) is added directly to the mixture of step (A). The addition of the protic solvent results in faster and/or more complete reaction between the polyepichlorohydrin polymer and azide compound, and it is believed that the protic solvent improves the performance of the quaternary amine compound in the invention. Generally amounts of 0.1 to 20 parts of protic solvent per 100 parts polyepichlorohydrin polymer are effective amounts in this invention, and preferably, amounts of 0.1 to 5 parts are used.

The method of this invention can be performed by incrementally adding the polyepichlorohydrin polymer (optionally mixed with an effective amount of solvent or diluent), under agitation, to a reaction vessel containing a mixture of the azide compound, quaternary amine compound, and optionally, an effective amount of solvent or diluent. Preferably, the reaction vessel will be equipped a stirring and cooling and heating means so that the mixture can be maintained under agitation and at about 60° to 130° C. during the reaction. Optionally, the sodium azide-quaternary-amine-compound-mixture can be heated to the reaction temperature before it is combined with the polyepichlorohydric polymer. After completion of the reaction, the poly(glycidyl azide) polymer can be recovered from the reaction product using conventional methods. The reaction product can be filtered to remove solid impurities, and then washed one or more times using water or a water-methanol mixture, and retaining the wash liquid. The poly(glycidyl azide) polymer is then recovered from the washed reaction product by vacuum evaporation of any solvent or diluent under reduced pressure (e.g. 5 to 60 mm Hg) at 40° to 125° C. The quaternary amine compound is then recovered from the wash liquid by evaporation or extraction.

The following examples are offered to aid in a better understanding of the present invention and are not to be unnecessarily construed as limiting the scope thereof.

EXAMPLE 1

(a)

$H_2NCH_2C(CH_3)_2CH_2N(CH_3)_2$ +

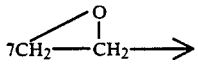

(~30%-0%)

$H(OC_2H_4)_aNHCH_2C(CH_3)_2CH_2N(CH_3)_21$ + (~70%-100%)

$[H(OC_2H_4)_b][H(OC_2H_4)_c]NCH_2C(CH_3)CH_2N(CH_3)_22$ a = ~7, b + c = ~7

Into a 2 L pressure vessel (Hastelloy C) was added 134 g (1.0 mole) of N,N-dimethylneopentanediamine (Aldrich) and 22 g solid KOH. The vessel was agitated, heated to 70° C. and 308 g (7.0 moles) of ethylene oxide added over a one hour period while maintaining the vessel temperature at 70°-80° C. with an air stream as needed. After addition of the ethylene oxide was complete, heating was continued for 45 minutes (70° C.) to yield the poly(oxyethylene) chain-containing products, 1 and 2.

(b)

1 + 2 + $CH_3Cl$ ⟶ (~30%-0%)

$R(OC_2H_4)_aN(CH3)CH_2C(CH_3)_2CH_2N^+(CH_3)_3Cl^-3$ + (~70%-100%)

$[R(OC_2H_4)_b][R(OC_2H_4)_c]NCH_2C(CH_3)_2CH_2N^+(CH_3)_3Cl^-4$ a = ~7, b + c = ~7, R is selected from $CH_3$ and H To the reaction mixture containing products, 1 and 2, was added 176 g of of 50% aqueous sodium hydroxide solution and the resulting mixture was heated to 80° C., then 161 g (3.2 moles) of methyl chloride was added. The resulting reaction mixture was heated at 80° C. for 4 hours, cooled to room temperature and evacuated to 20 torr for 15 minutes. The reaction mixture was removed from the pressure vessel, the NaCl by-product was filtered out and the mixture rinsed with two 50 mL portions of methanol, which were added to the product-containing filtrate. The product solution containing the quaternary amine compound Q-1A, a mixture of 3 and 4, was stripped at 60° C. and 20 torr to remove methanol and water.

A more homogeneous product, quaternary compound, Q-1B, comprised of about 100% of 4, is formed if about 30% (92 g) of the ethylene oxide is added to the reaction vessel containing the diamine and the mixture heated at 70° C. before adding the KOH and the balance (216 g, total 308 g) of the ethylene oxide with heat. Quaternization with methyl chloride, and product isolation carried out as before (for Q-1A).

EXAMPLE 2

(a)

$CH_3O(C_2H_4O)_{10}C_2H_{OH}+C_6H_3(CH_3)$-2,4-(NCO-)$_2$→$CH_3O(C_2H_4O)_{10}C_2H_4OC(O)NHC_6H_3(CH_3)$-2-NCO

To 259.7 g (1.49 equiv.) of toluene diisocyanate (TDI) (MONDUR TM TDS, grades I and II, Mobay) at 60° C. in a IL 3-necked flask was added, with overhead stirring, via an addition funnel, over 15 hours, about 500 g of M PEG 550 (a monomethyl polyethylene glycol of hydroxyl equivalent weight 494.8, Union Carbide). After about 20 hours of heating and stirring, an additional 200 g of M PEG 550 (total of 701 g, 1.42 equiv.) was added over a 1 hour period. Heating was continued for about 3 hours, at which time some of reaction mixture was removed leaving about 600 g (62%) for further reaction. An infrared spectrum of the reaction mixture showed evidence for a urethane group and an isocyanate moiety, consistent for the adduct 5.

(b)

5+$HOCH_2C(CH_3)_2CH_2N(CH_3)_2$→$CH_3O(C_2H_4O)_{10}C_2H_4OC(O)NHC_6H_3(CH_3)NH$-$C(O)OCH_2C(CH_3)_2CH_2N(CH_3)_2$ 6

To the heated, stirred reaction mixture containing the urethane adduct 5 (600 g, 0.93 equiv.) was added, over an 8 minute period, 103.8 g (0.79 mole) of N,N-dimethyl-3-hydroxy-2,2-dimethyl propyl amine (TCI America). The temperature of the reaction mixture rose from about 58° C. to about 80° C. after the addition was complete, then fell to 64° C. in about 15 minutes. An infrared spectrum of a sample of the reaction mixture showed the presence of unreacted isocyanate. Additional amine was added (i.e., 12.2 g after 40 minutes and 3.7 g after 85 minutes) after the start of the reaction for a total of 119.7 g (0.91 equiv.) amine added. After a total of 2 hours, the infrared spectrum of the reaction mixture showed no residual isocyanate remaining. Analysis by $^1H$ and $^{13}C$ NMR spectroscopy was consistent for the adduct structure 6.

(c)

6+$CH_3Cl$→$CH_3O(C_2H_4O)_{10}C_2H_4OC(O)NHC_6H_3(CH_3)NH$-$C(O)OCH_2C(CH_3)_2CH_2N^+(CH_3)_3\ Cl^-$ 7

Into a 2 L 316 stainless steel autoclave was placed 487 g ( 0.61 mole) of the amine adduct 6 and 146.4 g of chloroform solvent. The vessel was sealed and 62.7 g (1.24 mole) of methyl chloride was added and the contents were heated in an autoclave at 80° C. for 18 hours. After cooling and venting, 676 g of a thickened product mixture was obtained. Solvent was removed using a rotary evaporator under vacuum (water aspirator) to yield a viscous amber liquid. Analysis by $^1H$ and $^{13}C$ NMR spectroscopy was consistent for the quaternary amine compound, Q-2, structure 7.

EXAMPLE 3

Following the general procedure of Example 2 used in preparing PTC-3, Q-3, structure 8 below, was prepared using 2-(methoxyethoxy) ethanol in place of the monomethyl ether of the polyethylene glycol, M PEG 550 used in Example 2. These reactions are outlined in amount of ethane sulfonic equations (a)-(c). (A small amount of ethane sulfonic acid was added in reaction (a), and chloroform solvent was added before step (b) to give 80% solids solution). Analysis of the final product (a glass, pale amber material) by $^1H$ and $^{13}C$ NMR spectroscopy was consistent for the quaternary amine compound structure 10 (Q-3).

(a) $CH_3O(C_2H_4O)_2H + C_6H_3(CH_3)\text{-}2\text{-}NCO$ 8

(b)
$8 + HOCH_2C(CH_3)_2CH_2N(CH_3)_2 \rightarrow CH_3OC_2H_4OC_2H_4OC(O)NHC_6H_3(CH_3)NHC(O)OCH_2C(CH_3)_2CH_2N(CH_3)_2$ 9

(c)
$9 + CH_3Cl \rightarrow CH_3OC_2H_4OC_2H_4OC(O)NHC_6H_3(CH_3)NHC(O)OCH_2C(CH_3)_2CH_2N^+(CH_3)_3Cl^-$ 10 (Q-3)

EXAMPLE 4

$CH_3O(C_2H_4O)_{\sim 10}C_2H_4OC(O)NHC_6H_3(CH_3)\text{-}2\text{-}NCO$ 5 + $HOCH_2CH_2CH_2Cl \longrightarrow$ (a)

$CH_3O(C_2H_4O)_{10}C_2H_4OC(O)NHC_6H_3(CH_3)\text{-}2\text{-}NHCOCH_2CH_2CH_2Cl$ 11

A 250 mL 3-necked flask equipped with overhead stirrer was charged with 100 g (0.149 equiv.) of the urethane adduct 5 of Ex. 2, and 13.4 g (0.142 equiv.) 3-chloro-1-propanol. After 45 minutes of heating in a 60° C. bath., an infrared spectrum of the reaction mixture showed a strong isocyanate peak. Two drops of dibutyltin dilaurate was added and heating continued for an additional 0.5 hour with no change in the infrared spectrum. Addition of 3 drops of triethyl amine and continued heating for an additional hour produced a significant decrease in isocyanate content. At this point, an additional 4 drops of triethyl amine and 1.5 g 3-chloro-1-propanol (total 14.9 g. 0.149 equiv.) were added. At a total of 4 hours of heating, the isocyanate peak of the infrared spectrum of the reaction mixture was very small. Analysis by $^1H$ and $^{13}C$ NMR was consistent for the urethane chloride, 11

(b)

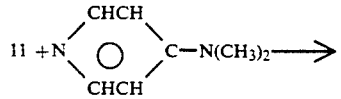

$CH_3O(C_2H_4O)_{10}C_2H_4OC(O)NHC_6H_3(CH_3)\text{-}2$

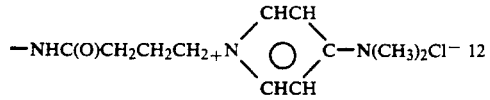

To a 100 mL 3-necked flask with overhead stirrer was charged 50.0 g (0.0655 equiv.) of the urethane chloride adduct and 8.0 g (0.0655 equiv.) of 4-(N,N-dimethylamino) pyridine. The flask was heated in a 100° C. bath for 15 minutes (pot temperature 95° C.), then the bath temperature raised to 110° C. for an additional 15 minutes (pot temperature 105° C.). The bath temperature was then raised to 124° C. After 15 minutes, the pot temperature had risen to 131° C. and after an additional 10 minutes, the reaction temperature dropped to 125° C. After a total of 2.5 hours reaction (1.5 hours at about 125° C.), a very viscous liquid product was obtained. Analysis by $^1H$ and $^{13}C$ NMR was consistent for the quaternary amine compound 12 (Q-4).

EXAMPLE 5

Following the general procedure of Example 4 used in preparing Q-4, the pyridinium salt compound Q-5, structure 14 below, was prepared utilizing using the urethane adduct 8, prepared as described in Ex. 3. The reactions are outline in equations (a) and (b) below. Analysis of the final product by $^1H$ and $^{13}C$ NMR was consistent for the quaternary amine compound 14 (Q-5)

$CH_3OC_2H_4OC_2H_4OC(O)NHC_6H_3(CH_3)\text{-}2\text{-}NCO$ 8 (Ex. 3) + $HOCH_2CH_2CH_2Cl \longrightarrow$ (a)

$CH_3OC_2H_4OC_2H_4OC(O)NHC_6H_3(CH_3)\text{-}2\text{-}NHCOCH_2CH_2CH_2Cl$ 13

(b)

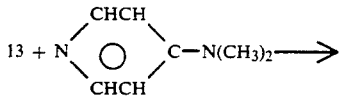

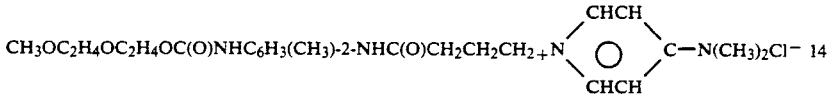

EXAMPLE 6

This example describes an alternate route to the pyridinum chloride compound (14) of Example 5. In this route, the quaternization reaction is conducted first (rather than last), then the free hydroxyl group of the hydroxypropyl pyridinium intermediate is reacted with the poly(oxyethylene) urethane isocyanate intermediate (5 of Ex. 2).

$HOCH_2CH_2CH_2Cl$ + (a)

-continued

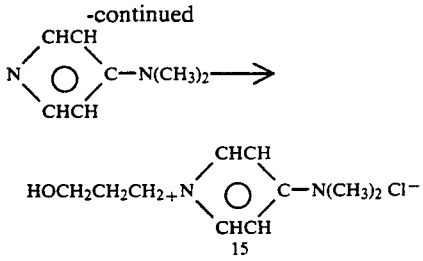

A 500 mL 3-necked flask equipped with overhead stirrer was charged with 50.0 g (0.41 equiv.) of 4-(N,N-dimethylamino) pyridine, and 77.4 g (0.82 equiv.) of 3-chloro-1-propanol and placed in a 100° C. bath. When the pot temperature reached 95° C. in 15 minutes (indicating no exotherm), the bath temperature was raised to 120° C. Within 10 minutes the pot temperature had reached 124° C. and was rising rapidly. Isopropyl acetate was added to control the exotherm. Within a few seconds, solids appeared in the reaction mixture. After refluxing for 10 minutes, the propyl acetate and excess 3-chloro-1-propanol were removed at reduced pressure, to a final pressure of 1.5 torr, to yield a white powder. Analysis by $^1H$ and $^{13}C$ NMR spectroscopy was consistent for the compound 15

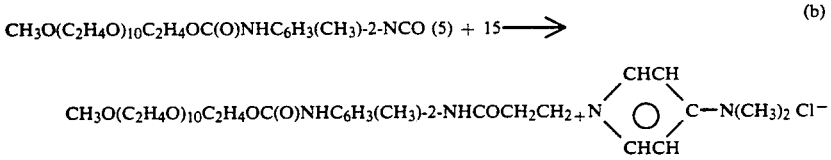

A 3-necked 500 mL flask was charged with 32.4 g (0.15 equiv.) of 1-(3-hydroxypropyl)-4-(N,N-dimethylamino)pyridinium chloride (15) prepared above and 100 g (0.15 equiv.) of the poly(oxyethylene) urethane isocyanate intermediate (5 of Ex. 2) and the reaction mixture heated in a 75° C. bath. (A reference infrared spectrum of the reaction mixture taken at the start of the reaction showed a strong isocyanate peak.) After 20 minutes, the bath temperature was raised to 85° C. and 4 drops of triethyl amine were added and heating continued at 85° C. for 10 minutes then at 90° C. for 10 minutes. At this time the pot temperature had risen to 94° C., then to 98° C. after an additional 20 minutes of heating (90° C. bath). The reaction mixture had changed from a suspension of white particles to a clear solution of increased viscosity. After a total of 2.5 hours of heating at 90° C., the isocyanate peak in the infrared spectrum was almost gone. An additional 2.5 g (0.004 equiv.) of the hydroxy propyl pyridinium chloride (15 above) was added to the reaction mixture and heating continued. After about one hour of heating, the infrared spectrum showed the isocyanate peak had almost disappeared. The product was a soft, amber solid. Analysis by $^1H$ and $^{13}C$ NMR spectroscopy was consistent for the compound 16 (Q-6).

EXAMPLE 7

Following the general procedure of Example 5 used in preparing Q-5, a related pyridinium compound, Q-7, structure 18 below, was prepared utilizing the urethane adduct 8, prepared as in Example 3. These reactions are outlined in equations (a) & (b). A small amount of dibutyltin dilaurate was used as a catalyst in reaction (a). Analysis of the final product (an amber glass) by $^1H$ and $^{13}C$ NMR spectroscopy was consistent for the pyridinium compound 18 (Q-7).

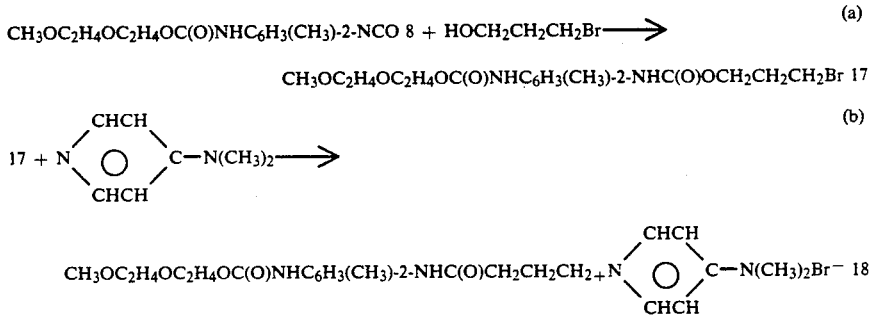

EXAMPLE 8 and COMPARATIVE EXAMPLES C1–C3

Four different Compounds (Table 1 and footnotes) including 3 known compounds and one quaternary amine compound were evaluated for catalytic activity with a model polyepichlorohydrin compound (i.e., 2-methoxyethyl chloride) (1) according to the following reaction:

In a 40 mL glass vial containing a magnetic stir bar was placed 6.28 g (67 mmol) 2-methoxyethyl chloride (I) (Aldrich), 3.31 g of the compound being evaluated for catalytic activity (on a dry basis), sufficient water to bring total water content to 0.21 g (6% with respect to the catalytic compound), 1.32 g 1,3-dioxolane solvent (Grant Chemical), and 5.19 g (80 mmol, 20% excess) sodium azide (Toyo Kasei Kogyo).

All four vials were lowered at the same time into a mechanically agitated 80° C. silicone oil bath over a strong magnetic stirrer. Small aliquots of the reaction mixtures were withdrawn with a pipet at various time intervals and analyzed by gas chromatography for (a) % conversion to the desired 2-methoxyethyl azide product (2) and (b) side-product formation. Conversion results are summarized in Table 1 and side-product formation in Table 2.

TABLE 1

| Example No. | PTC (ref.)* | % Conversion to $CH_2OCH_2CH_2N_3$ after hrs indicated .02 | .04 | .43 | 1.02 | 1.62 hr | 4.22 | 15.1 | 18.9 |
|---|---|---|---|---|---|---|---|---|---|
| C1 | MTBAA (1)* | 4.0% | | | 72.0 | | | 100 | |
| C2 | TBAC (2) | | 18.3 | | 70.3 | | | 98.1 | |
| 8 | Q-1B (3) | | | 6.3 | | 12.1 | 29.0 | | 99.6 |
| C3 | MEIC (4) | | | 4.5 | | 16.3 | 39.2 | | 97.7 |

(1)* Methyltributylammonium azide, $CH_3(C_4H_9)_3N^+ N_3^-$ (prepared from the corresponding chloride with sodium azide)
(2) Tetrabutylammonium chloride, $(C_4H_9)_4N^+ Cl^-$ (Aldrich)
(3) From Example 1
(4) 1-Methyl-3-ethylimidazolium chloride

TABLE 2

| Example No. | PTC (source)* | Relative side-reaction product formation** (wt. normalized GC area-total of side products) after hrs indicated .02 | .04 | .43 | 1.02 | 1.62 hr | 4.22 | 15.1 | 18.9 |
|---|---|---|---|---|---|---|---|---|---|
| C1 | MTBAA (1)* | 2680 (5)** | | | 1863 (5) | | | 2671 (5) | |
| C2 | TBAC (2)* | | 2979 (6) | | 2983 (6) | | | 3079 (6) | |
| 8 | Q-1B (3)* | | | 26 (8) | | 35 (8) | 43 (8) | | 59 (8) |
| C3 | MEIC (4)* | | | 0 | | 0 | 0 | | 123 (9) |

*see footnotes (Table 1)
**(5) includes tributyl amine, methyldibutyl amine and butene derivatives.
(6) includes tributyl amine and butene derivatives.
(7) pyridine derivs.,
(8) unknown compound 1 (15.5 min peak).
(9) unknowns 2 & 3 (10.2 & 17.5 min peaks)

Although reaction rates of reactions using the known quaternary ammonium compounds MTBAA (Ex. Cl) and TBAC (Ex. C2) were the fastest, large amounts of tertiary amine and other degradation products make them less desirable for use in polyepichlorohydrin-azide reactions than Q-1B (Ex. 8) because they will be less recyclable and because the degradation products may be difficult to remove from poly(glycidyl azide) polymer product.

EXAMPLE 9 and COMPARATIVE EXAMPLES C4–6

Reactions of polyepichlorohydrin polymer (PECH) with sodium azide using quaternary amine compounds were carried out to compare the catalytic activity and stability of novel compound Q-3 against known compounds in reactions to from poly(glycidyl azide) polymer (GAP) according to the following reaction:

$$H(OCHCH_2ClCH_2)_nOCH_2CHCH_2ClO(CH_2CHCH_2Cl)_mOH + NaN_3 \rightarrow H(OCHCH_2N_3CH_2)_nOCH_2CHCH_2N_3O(CH_2CHCH_2N_3)_mOH + NaCl$$

where n+m is about 22 to 28.

The test formulations are given in Table 3. In all of the formulations, 3.45 grams of polyepichlorohydrin polymer solution(1) and 33 mmol $NaN_3$ (10% excess) was used. Reactants and catalysts were placed in 40-ml vials containing a magnetic stir bar. All vials were lowered simultaneously into a mechanically agitated silicone oil bath set on a magnetic stirrer. The oil bath temperature was held constant at 90 C for the duration of the 38-hr test.

(1)Composition by weight of this polyepichlorohydrin solution is 68.3% of a 2400 MN polyepichlorohydrin diol, 12.05% 1-chloro-3-(3-chloropropoxy)-2-propanol, 12.05% dioxolane (Grant Chemical), and 7.6% diethyleneglycol monobutyl ether acetate (internal std.) (Eastman).

TABLE 3

| Example No. | CAT Name | CMPD (mmol) | mol $H^2O$/mol Cat. Cmp. | Dioxolane in $NaN_3$ |
|---|---|---|---|---|
| 9 | Q-2 | 1.7 | 5.4 | 0.50 |
| C4 | 75% of MTBAC[3] | 6.3 | 4.37 | 0.50 |
| C5 | 75% of MTBAC[3] | 3.8 | 4.37 | 1.29 |
| C6 | MTIBA[4] | 6.3 | 1.46 | 0.50 |

[2]On a dry basis for a theoretical yield of 2.97 g GAP.
[3]75% aqueous Methyltributylammonium Chloride (SACHEM).
[4]Me $(i\text{-}Bu)_3N^+$ Cl.

TABLE 4

| Ex. No. | % Conversion of PECH to GAP 0.17 hr | 4.2 hr | 16.2 hr | Degradation Products[5] |
|---|---|---|---|---|
| 9 | 9.1 | 78.1 | 100 | None |
| C4 | 19.5 | 100 | 100 | 0.21[6] |
| C5 | 16.8 | 100 | 100 | 0.31[6] |
| C6 | 13.4 | 57.4 | 100 | 0.13[7] |

As determined by GC area of degradation products normalized to the internal standard. The PeCH contains 7.6 wt % internal standard.

Table 4 results instruct that although the reaction with Q-3 was not as fast as that with MTBAC, Q-3 produced the cleanest reaction, even cleaner than sterically-hindered MTIBA.

EXAMPLES 10–17 and COMPARATIVE EXAMPLES C7–C8

The following Examples illustrate the utility of the quarternary amine compounds as antistatic agents. Three pieces 10 cm×10 cm) of Dacron TM polyester fabric were soaked for 22 hours at 70° C. in 5 wt. % solutions in methanol/water (70/30 volume %) of three novel quaternary compounds of this invention. A control sample was soaked only in the methanol/water solvent containing no salt. Each fabric sample was dried for 3 minutes in a vacuum oven (10 torr) at 60° C. The surface resistivity was measured in ohms per test sample using a compliance cell with parallel electrodes about 7.5 cm apart (ASTM-D 257). Conditions were room temperature (about 23° C.) and 55–60% relative humidity.

TABLE 5

| Example No. | Quat. Salt (ref.) | Surface Resistivity, ohms Side 1 | Side 2 | Average value |
|---|---|---|---|---|
| C7 | (untreated) | $9.2 \times 10^{11}$ | $13 \times 10^{11}$ | $11.1 \times 10^{11}$ |
| 10 | Q-2 (Ex. 2) | $6.2 \times 10^{8}$ | $6.9 \times 10^{8}$ | $6.5 \times 10^{8}$ |
| 11 | Q-1A (Ex. 1) | $2.7 \times 10^{7}$ | $2.9 \times 10^{7}$ | $2.8 \times 10^{7}$ |
| 12 | Q-1B (Ex. 1) | $2.5 \times 10^{7}$ | $2.1 \times 10^{7}$ | $2.3 \times 10^{7}$ |

The above results clearly demonstrate that the novel compounds of this invention (Q-1A, Q-1B & Q-2) possess useful antistatic properties. For example, the average resistivity of polyester fabric treated with Q-1B (Ex.

12) is reduced by over 48,000-fold compared with the same untreated polyester (Comparative Ex. 7).

In another series of tests, five additional samples of polyester fabric were treated as described above with quaternary compounds of the invention and evaluated for surface resistivity. The conditions were room temperature and 64% relative humidity. The results are summarized in Table 6.

TABLE 6

| Example No. | Quat. Salt (ref.) | Surface Resistivity, ohms Side 1 | Side 2 | Average value |
|---|---|---|---|---|
| C8 | (untreated) | $1.3 \times 10^{14}$ | $2.2 \times 10^{14}$ | $1.7 \times 1014$ |
| 13 | Q-3 (Ex. 3) | $3.3 \times 10^{9}$ | $3.6 \times 10^{9}$ | $3.2 \times 10^{9}$ |
| 14 | Q-4 (Ex. 4) | $1.7 \times 10^{9}$ | $1.5 \times 10^{9}$ | $1.6 \times 10^{9}$ |
| 15 | Q-5 (Ex. 5) | $9.7 \times 10^{9}$ | $8.3 \times 10^{9}$ | $9 \times 10^{9}$ |
| 16 | Q-6 (Ex. 6) | $2.9 \times 10^{9}$ | $2.6 \times 10^{9}$ | $2.75 \times 10^{9}$ |
| 17 | Q-7 (Ex. 7) | $1.3 \times 10^{9}$ | $2.2 \times 10^{9}$ | $1.7 \times 10^{9}$ |

Again these results indicate significant decrease in surface resitivity of polyester fabric treated with the quaternary salts of this invention.

We claim:

1. A method of making a product comprising poly(-glycidyl azide) polymer the method comprising the steps of:

(A) Preparing a mixture comprising:

(1) alkali metal and/or alkaline earth metal azides;

(2) an effective amount of a quaternary amine compound which compound is selected from the group consisting of compounds having the following representative formulas:

$$(R^1)_a(R^2)_{(4-a)}N^{(+)}X^{(-)}, \quad (I)$$

$$(R^3)_2NC_5H_4N^{(+)}R^1X^{(-)}, \quad (II)$$

$$(R^3)_2NC_6H_4R^4{=}R^4C_5H_4N^{(+)}R^1X^{(-)} \quad (III)$$

$$[(R^2)_3N^{(+)}]_2R^8X^{(-)}{}_2 \quad (IV)$$

$$[(R^3)_2NC_5H_4N^{+}]_2R^8X^{(-)}{}_2 \quad (V)$$

and blends of compounds having the representative formula (I), (II), (III), (IV) and (V), wherein:

(a) $R^1$ can be the same or different and selected from: $\{[R^5(OR^6)_b]_{(2-c)}(R^5)_cN[C(R^7)_2]_d\}_eC(R^7)_{(3-e)}CH2$—, or $\{R^5(OR^6)_fO[C(R^7)_{12}]_d\}_eC(R^7)_{(3-e)}CH_2$—, or $\{R^5(OR^6)_bQ[C(R^7)_2]_d\}_eC(R^7)_{(3-e)}CH_2$—, wherein $R^5$ groups can be the same or different and are selected from hydrogen or a $C_1$ to $C_{10}$, alkyl group, $R^6$ groups can be the same and different and are divalent organic groups, $R^7$ groups can be the same or different and are selected from hydrogen and $C_1$ to $C_{10}$ alkyl groups Q is selected from alkylene, arylene and combinations thereof, and may be substituted with aryl or alkyl groups, oxygen, nitrogen, carbonyl, urylene, carbamato and imino groups, and combinations thereof, (b) $R^2$ groups are the same or different and are selected from $C_1$ to $C_{10}$ alkyl groups, and (c) $R^3$ groups can be the same or different and are selected from $C_1$ to $C_8$ alkyl groups containing oxygen or nitrogen hetero atoms, provided that such hetero atoms are attached only to carbon atoms, and the two $R^6$ groups together with adjacent nitrogen atom shown in formula (II) can form a heterocyclic ring containing 3 to 7 atoms, (d) $R^4$ groups can be the same or different and are selected from —CH=, —$CR^2$= and —N=.

(e) $R^8$ groups are defined as —$CH_2[C(R^7)_2]_{(d+1)}(OR^6)_bQ[C(R^7)_2]_{(d+1)}CH_2$—

(f) a is a number from 1 to 3, (g) b is a number from 1 to 50, (h) c is a number from 0 to 1, (i) d is a number from 1 to 15, (j) e is a number from 1 to 3, (k) f is a number from 0 to 50, (l) X is a suitable anion.

(B) reacting the mixture prepared in step (A) with polyepichlorohydrin polymer to produce a reaction product, and (C) recovering from the reaction product a product comprising poly(glycidyl azide) polymer.

2. The method according to claim 1 wherein the product recovered from the reaction product in step (C) consists essentially of poly(glycidyl azide) polymer.

3. The method according to claim 1 wherein the alkaline metal or alkali earth metal azide is sodium azide.

4. The method according to claim 3 wherein the quaternary amine compound is selected from the group consisting of:

~30% $R(OCH_2H_4)_aN(CH_3)CH_2C(CH_3)_2CH_2N^+(CH_3)_3Cl^-$

~70% $[R(OC_2H_4)_b][R(OC_2H_4)_c]NCH_2C(CH_3)_2CH_2N^+(CH_3)_3Cl^-$ $a=\sim7$, $b+c=\sim7$, R is selected from $CH_3$ and H, $[R(OC_2H_4)_b][R(OC_2H_4)_c]NCH_2C(CH_3)_2CH_2N^+(CH_3)_3Cl^-$ $b+c=\sim7$, R is selected from $CH_3$ and H, $CH_3O(C_2H_4O)_{11}C(O)NHC_6H_3(CH_3)NHC(O)OCH_2C(CH_3)_2CH_2N^+(CH_3)_3Cl^-$, $CH_3O(C_2H_4O)_2C(O)NHC_6H_3(CH_3)NHC(O)OCH_2C(CH_3)_2CH_2N^+(CH_3)_3Cl^-$, $CH_3O(C_2H_4O)_{11}C(O)NHC_6H_3(CH_3)NHC(O)OCH_2CH_2CH_2C^+NC_5H_4N(CH_3)_2Cl^-$, $CH_3O(C_2H_4O)_2C(O)NHC_6H_5(CH_3)NHC(O)OCH_2CH_2CH_2C^+NC_5H_4N(CH_3)_2Cl^-$, $CH_3O(C_2H_4O)_nCH_2CHRCH_2C^+NC_5H_4N(CH_3)_2Cl^-$ wherein n=0–3, R=H or $CH_3$, $CH_3O(C_2H_4O)_nCH_2C(C_2H_5)(C_4H_9)CH_2^+NC_5H_4N(CH_3)_2Cl^-$, $CH_3O(C_2H_4O)_nCH_2C(CH_3)_2CH_2^+NC_5H_4N(CH_3)_2Cl^-$, $CH_3O(C_2H_4O)_nCH_2C(C_2H_5)(C_4H_9)CH_2^+NC_5H_4N$-cyclo-$(C_2H_4)_2CHCH_3Cl^-$, $CH_3O(C_2H_4O)_nCH_2C(CH_3)_2CH_2^+NC_5H_4N$-cyclo-$(C_2H_4)_2CHCH_3Cl^-$.

5. The method according to claim 1 wherein he mixture of step A further comprises an effective amount of a protic solvent.

6. The method according to claim 5 wherein the effective amount of to protic solvent is 0.1 to 20 parts of protic solvent per 100 parts of polyepichlorohydrin polymer.

7. The method according to claim 1 wherein the mixture prepared in step (A) further comprises an effective amount of solvent of diluent.

8. The method according to claim 7 wherein the effective amount of solvent or diluent is 15 to 30 parts per 100 parts polyepichlorohydrin polymer.

9. The method according to claim 7 wherein the solvent or diluent is selected from the group consisting of tetrahydrofuran, 1,3-dioxolane, 1,4-dioxane and $CH_3O(C_2H_4O)_nCH_5$ where n is a number from 1 to 7.

* * * * *